US009652036B2

(12) United States Patent
Kobayashi

(10) Patent No.: US 9,652,036 B2
(45) Date of Patent: *May 16, 2017

(54) DEVICE, HEAD MOUNTED DISPLAY, CONTROL METHOD OF DEVICE AND CONTROL METHOD OF HEAD MOUNTED DISPLAY

(71) Applicant: SEIKO EPSON CORPORATION, Tokyo (JP)

(72) Inventor: Shinichi Kobayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/732,324

(22) Filed: Jun. 5, 2015

(65) Prior Publication Data

US 2015/0268720 A1  Sep. 24, 2015

Related U.S. Application Data

(63) Continuation of application No. 13/418,861, filed on Mar. 13, 2012, now Pat. No. 9,081,416.

(30) Foreign Application Priority Data

Mar. 24, 2011  (JP) .................................. 2011-066383
Nov. 24, 2011  (JP) .................................. 2011-255791

(51) Int. Cl.
G06F 3/01    (2006.01)
G06F 1/16    (2006.01)
G02B 27/00   (2006.01)
G02B 27/01   (2006.01)

(52) U.S. Cl.
CPC ......... *G06F 3/013* (2013.01); *G02B 27/0093* (2013.01); *G02B 27/0172* (2013.01); *G02B 27/0176* (2013.01); *G02B 27/0179* (2013.01); *G06F 1/163* (2013.01); *G06F 3/017* (2013.01); *G02B 2027/0187* (2013.01)

(58) Field of Classification Search
None
See application file for complete search history.

(56) References Cited

U.S. PATENT DOCUMENTS

| 5,635,948 | A  | 6/1997  | Tonosaki |
| 7,056,216 | B2 | 6/2006  | Ohshima |
| 7,414,791 | B2 | 8/2008  | Urakawa et al. |
| 8,228,608 | B2 | 7/2012  | Yamamoto |
| 2005/0199783 | A1 | 9/2005 | Wenstrand et al. |
| 2006/0077558 | A1 | 4/2006 | Urakawa et al. |
| 2006/0097974 | A1 | 5/2006 | Hashimoto et al. |
| 2007/0273611 | A1 | 11/2007 | Torch |
| 2009/0273687 | A1 | 11/2009 | Tsukizawa et al. |
| 2010/0039376 | A1 | 2/2010 | Wang |

(Continued)

FOREIGN PATENT DOCUMENTS

| JP | S49-114285 A | 10/1974 |
| JP | H05-328256 A | 12/1993 |

(Continued)

*Primary Examiner* — Joseph Haley
(74) *Attorney, Agent, or Firm* — Oliff PLC

(57) ABSTRACT

A device includes a detection unit that detects states of eyelids of a user, and a control unit that performs operations in response to the states of the eyelids of the user detected by the detection unit.

24 Claims, 9 Drawing Sheets

(56) References Cited

U.S. PATENT DOCUMENTS

| | | |
|---|---|---|
| 2010/0073497 A1 | 3/2010 | Katsumata et al. |
| 2010/0085462 A1 | 4/2010 | Sako et al. |
| 2011/0205148 A1* | 8/2011 | Corriveau ............... G09B 5/06 345/156 |
| 2012/0200478 A1 | 8/2012 | Kobayashi |
| 2012/0206443 A1 | 8/2012 | Kimura et al. |
| 2012/0242560 A1 | 9/2012 | Nakada et al. |
| 2012/0242677 A1 | 9/2012 | Kobayashi |
| 2014/0152688 A1 | 6/2014 | Sako et al. |
| 2015/0268471 A1 | 9/2015 | Sako et al. |

FOREIGN PATENT DOCUMENTS

| | | |
|---|---|---|
| JP | 6-314331 A | 11/1994 |
| JP | 7-209600 A | 8/1995 |
| JP | 07-294844 | 11/1995 |
| JP | 08-179275 | 7/1996 |
| JP | 2000-353046 A | 12/2000 |
| JP | 2005-269891 A | 9/2005 |
| JP | 2006-105889 A | 4/2006 |
| JP | 2006-133551 A | 5/2006 |
| JP | 2007-078565 A | 3/2007 |
| JP | 2008-096867 A | 4/2008 |
| JP | 2008-198078 A | 8/2008 |
| JP | 2009-025689 A | 2/2009 |
| JP | 2009-192583 A | 8/2009 |
| JP | 2010-074735 A | 4/2010 |
| JP | 2010-145765 A | 7/2010 |
| JP | 4560368 B2 | 7/2010 |

\* cited by examiner

"0"... EYELID IS CLOSED
"1"... EYELID IS OPENED

| PATTERN NAME | RIGHT EYE T1 | RIGHT EYE T2 | LEFT EYE T1 | LEFT EYE T2 | FUNCTION ASSIGNATION (EXAMPLE) |
|---|---|---|---|---|---|
| P01 | 0 | 0 | 0 | 0 | — |
| P02 | 0 | 0 | 0 | 1 | TRANSIT TO STANDBY MODE |
| P03 | 0 | 0 | 1 | 0 | INCREASE LUMINANCE OF LIGHT SOURCE |
| P04 | 0 | 0 | 1 | 1 | — |
| P05 | 0 | 1 | 0 | 0 | REDUCE LUMINANCE OF LIGHT SOURCE |
| P06 | 0 | 1 | 0 | 1 | — |
| P07 | 0 | 1 | 1 | 0 | POWER OFF |
| P08 | 0 | 1 | 1 | 1 | — |
| P09 | 1 | 0 | 0 | 0 | — |
| P10 | 1 | 0 | 0 | 1 | "BACK" OF BROWSER |
| P11 | 1 | 0 | 1 | 0 | — |
| P12 | 1 | 0 | 1 | 1 | "TO HOME" OF BROWSER |
| P13 | 1 | 1 | 0 | 0 | — |
| P14 | 1 | 1 | 0 | 1 | — |
| P15 | 1 | 1 | 1 | 0 | RECOVER FROM STANDBY MODE |
| P16 | 1 | 1 | 1 | 1 | — |

FIG. 8

"0"... EYELID IS CLOSED
"1"... EYELID IS OPENED

| PATTERN NAME | RIGHT EYE | LEFT EYE | FUNCTION ASSIGNATION (EXAMPLE) | |
|---|---|---|---|---|
| | | | AT BROWSER | AT REPRODUCTION OF MOVING IMAGE |
| P21 | 0 | 0 | BACK | TO NEXT CHAPTER |
| P22 | 0 | 1 | TO HOME | PAUSE |
| P23 | 1 | 0 | MENU | PLAY |
| P24 | 1 | 1 | — | — |

FIG. 9

"0"... EYELID IS CLOSED
"1"... EYELID IS OPENED

| | | | | | | | | BINARY | HEX | PATTERN NAME |
|---|---|---|---|---|---|---|---|---|---|---|
| Address | RIGHT EYE | 0 | | 1 | | 1 | 0 | | 0110 | 6 | P37 |
| Data | LEFT EYE | | 1 | | 1 | | 1 | | 1 | 1111 | F | P46 |

FIG. 10A

| PATTERN NAME | Address or Data | | | | | |
|---|---|---|---|---|---|---|
| | HEX | | BINARY | | | |
| P31 | 0 | 0 | 0 | 0 | 0 | 0 |
| P32 | 1 | 1 | 0 | 0 | 0 | 1 |
| P33 | 2 | 2 | 0 | 0 | 1 | 0 |
| P34 | 3 | 3 | 0 | 0 | 1 | 1 |
| P35 | 4 | 4 | 0 | 1 | 0 | 0 |
| P36 | 5 | 5 | 0 | 1 | 0 | 1 |
| P37 | 6 | 6 | 0 | 1 | 1 | 0 |
| P38 | 7 | 7 | 0 | 1 | 1 | 1 |
| P39 | 8 | 8 | 1 | 0 | 0 | 0 |
| P40 | 9 | 9 | 1 | 0 | 0 | 1 |
| P41 | 10 | A | 1 | 0 | 1 | 0 |
| P42 | 11 | B | 1 | 0 | 1 | 1 |
| P43 | 12 | C | 1 | 1 | 0 | 0 |
| P44 | 13 | D | 1 | 1 | 0 | 1 |
| P45 | 14 | E | 1 | 1 | 1 | 0 |
| P46 | 15 | F | 1 | 1 | 1 | 1 |

FIG.10B

DEVICE, HEAD MOUNTED DISPLAY, CONTROL METHOD OF DEVICE AND CONTROL METHOD OF HEAD MOUNTED DISPLAY

This is a Continuation of application Ser. No. 13/418,861 filed Mar. 13, 2012. This application also claims priority from Japanese Patent Application No. 2011-066383 filed Mar. 24, 2011 and Japanese Patent Application No. 2011-255791 filed Nov. 24, 2011. The disclosures of each of the earlier applications are incorporated herein by reference in its entirety.

BACKGROUND

1. Technical Field

The present invention relates to a device, a head mounted display, a control method of the device, and a control method of the head mounted display.

2. Related Art

Head mounted displays as displays mounted on heads have been known. For example, the head mounted display generates image light representing an image using a liquid crystal display and a light source, guiding the generated image light to eyes of a user using a projection system and a light guide plate, and thereby, allows the user to visually recognize a virtual image.

In the head mounted display, it is preferable that the user may not only visually recognize the generated virtual image but also visually recognize input devices such as a mouse, a keyboard, etc. Accordingly, a technology of providing a sensor that may senses the position of a hand of the user (for example, an infrared sensor) and changing the position of the virtual image to be visually recognized in response to the position of the hand of the user is known (for example, see JP-A-6-314331).

Further, in the head mounted display, lower power consumption is required. Especially, in the head mounted display driven by a battery for improvement of portability, for the longer available time, the lower power consumption is further required. In this regard, to reduce the power consumption, a head mounted display without the necessity of a light emission source is known (for example, see JP-A-7-209600).

JP-A-2009-192583, JP-A-2006-105889, and JP-A-2000-353046 are other examples of related art.

However, in the head mounted display in related art, it is necessary for the user to use a hand at each time of operation and, when display is unnecessary, prior button operation is necessary, and thus, there is room for improvement in convenience. Note that the problem is not limited to the head mounted display, but common to all equipment.

Further, in the head mounted display in related art, no light emission source is provided, and there is a problem that it may be impossible to view a beautiful image in the environment without sufficient outdoor light.

SUMMARY

An advantage of some aspects of the invention is to provide a technology by which a user can operate a device without using a hand. Another advantage of some aspects of the invention is to provide a technology of suppressing power consumption without deterioration of quality of a displayed image in a head mounted display.

Application Example 1

This application example of the invention is directed to a device including a detection unit that detects states of eyelids of a user, and a control unit that gives instructions in response to the states of the eyelids of the user detected by the detection unit.

In the device, the detection unit detects the states of the eyelids of the user and the control unit gives instructions in response to the states of the eyelids, and thereby, the user can perform operations without using hands and the operability may be improved.

Application Example 2

This application example of the invention is directed to a head mounted display including an image display unit having an image light generation part that generates and outputs image light based on image data and a light guide part that guides the image light to eyes of a user and allowing the user to visually recognize a virtual image, and the device according to Application Example 1 connected to the image display unit, wherein the control unit transmits the image data to the image display unit and controls image display by the image display unit, and switches plural operation modes with different power consumption in response to the states of the eyelids of the user detected by the detection unit.

In the head mounted display, the detection unit detects the states of the eyelids of the user. The control unit switches to the plural operation modes with different power consumption in response to the detected states of the eyelids. Accordingly, the head mounted display operates in the appropriate operation mode in response to the states of the eyelids of the user, and thereby, may reduce the power consumption.

Application Example 3

This application example of the invention is directed to the head mounted display according to Application Example 2, wherein the control unit performs power-saving transition as transition to the operation mode with lower power consumption when the detection unit detects the eyelids of the user kept closed in a predetermined time.

If the eye lids of the user are closed in the predetermined time, it is considered highly possible that the user is not viewing the image. In the head mounted display, the control unit performs power-saving transition as transition to the operation mode with lower power consumption when the detection unit detects the eyelids of the user kept closed in the predetermined time, and thereby, power consumption may be made smaller than in the past while reduction of the convenience of the user is suppressed.

Application Example 4

This application example of the invention is directed to the head mounted display according to Application Example 3, wherein the control unit performs recovery transition as transition to the operation mode with higher power consumption when the detection unit detects the eyelids of the user opened in a predetermined time after the power-saving transition.

If the eye lids of the user are opened in the predetermined time, it is considered highly possible that the user is viewing the image. In the head mounted display, the control unit performs recovery transition as transition to the operation mode with higher power consumption when the detection unit detects the eyelids of the user opened in a predetermined time after the power-saving transition, and thereby, the recovery transition may be promptly performed.

Application Example 5

This application example of the invention is directed to the head mounted display according to Application Example 3 or 4, wherein the image light generation part includes a light source that outputs light and an image generation part that converts the light output from the light source into image light representing an image based on the image data, and the control unit reduces the light output from the light source at the power-saving transition.

In the head mounted display, the control unit reduces the light output from the light source at the power-saving transition, and thereby, the power consumption may be reduced.

Application Example 6

This application example of the invention is directed to the head mounted display according to Application Example 5, wherein the light source includes a light source for right eye and a light source for left eye, and the control unit reduces the light output from one of the light source for right eye and the light source for left eye at the power-saving transition.

In the head mounted display, the control unit reduces the light output from one of the light source for right eye and the light source for left eye at the power-saving transition, and thereby, flexible reduction of the power consumption may be realized.

Application Example 7

This application example of the invention is directed to the head mounted display according to Application Example 3 or 4, wherein the image light generation part includes a light source that outputs light and an image generation part that converts the light output from the light source into image light representing an image based on the image data, and the control unit stops an operation of the image generation part at the power-saving transition.

In the head mounted display, the control unit stops the operation of the image generation part at the power-saving transition, and thereby, the power consumption may be reduced.

Application Example 8

This application example of the invention is directed to the head mounted display according to Application Example 4, wherein the image light generation part includes a light source that outputs light and an image generation part that converts the light output from the light source into image light representing an image based on the image data, and the control unit stops an operation of the image generation part at the power-saving transition and starts the operation of the image generation part again at the recovery transition.

In the head mounted display, the control unit starts the operation of the image generation part again at the recovery transition, and thereby, the recovery transition may promptly be performed.

Application Example 9

This application example of the invention is directed to the head mounted display according to Application Example 3 or 4, wherein the control unit includes a functional part that realizes plural functions and stops a partial operation of the functional part that realizes plural functions at the power-saving transition.

In the head mounted display, the control unit stops the partial operation of the functional part that realizes plural functions at the power-saving transition, and thereby, the power consumption may be reduced.

Application Example 10

This application example of the invention is directed to the head mounted display according to Application Example 9, wherein the control unit further has an operation part and starts the stopped operation of the functional part again when the operation part receives a specific operation after the power-saving transition.

In the head mounted display, the control unit starts the stopped operation of the functional part again when the operation part receives the specific operation after the power-saving transition, and thereby, even though the detection unit does not detect the states of the eyelids of the user, the recovery transition may promptly be performed.

Application Example 11

This application example of the invention is directed to the head mounted display according to Application Example 10, wherein the control unit stores information of the image displayed by the image display unit at power-saving transition and restarts display from the image displayed at the power-saving transition at the recovery transition.

In the head mounted display, the control unit restarts display from the image displayed at the power-saving transition at the recovery transition, and thereby, the intended image may be efficiently viewed at the recovery transition and the convenience may be improved.

Application Example 12

This application example of the invention is directed to the head mounted display according to Application Example 3, wherein the control unit performs the power-saving transition with much lower power consumption when the detection unit detects the eyelids of the user kept closed in a predetermined time after the power-saving transition.

In the head mounted display, the control unit performs the power-saving transition with lower power consumption in a stepwise manner in response to the states of the eyelids of the user. Accordingly, the head mounted display may promptly perform the recovery transition while reducing the power consumption.

Application Example 13

This application example of the invention is directed to the device according to Application Example 1, wherein the control unit converts respective patterns of the states of the eyelids detected by the detection unit into input information according to a predetermined rule.

In the device, the detection unit detects the pattern of the states of the eyelids and the control unit converts the instruction assigned to the pattern into input information according to the predetermined rule, and thereby, the plural instructions assigned to the patterns may be executed and the convenience may be improved.

Application Example 14

This application example of the invention is directed to the device according to Application Example 13, wherein the control unit performs a predetermined operation in response to the input information.

In the device, the control unit performs the operations assigned in response to the input information converted according to the respective patterns, and thereby, the plural functions assigned to the patterns may be executed and the convenience may be improved.

Application Example 15

This application example of the invention is directed to the device according to Application Example 13 or 14, wherein the detection unit detects opened and closed states of the eyelids at predetermined times.

In the device, the detection unit detects and determines two kinds of states of the opened state and the closed state of the eyelids at predetermined times, and thereby, operability with high accuracy and less false detection of the states of the eyelids may be realized.

Application Example 16

This application example of the invention is directed to the device according to Application Example 15, wherein the respective patterns include patterns defined by combinations of the opened and closed states of the eyelids at the respective plural times.

In the device, the patterns of the opened and closed states of the eyelids are the patterns defined by the combinations of the opened and closed states of the eyelids at the plural predetermined times, and thereby, the instructions in response to the plural patterns may be performed and the convenience may be improved.

Application Example 17

This application example of the invention is directed to the device according to Application Example 15 or 16, wherein the detection unit detects the states of the right eyelid and the states of the left eyelid, and the respective patterns include patterns defined by combinations of the states of the right eyelid and the states of the left eyelid.

In the device, the detection unit detects the opened and closed states of the right eyelid and the left eyelid, and the patterns of the opened and closed states of the eyelids are patterns defined by the combinations of the opened and closed states of the right eyelid and the left eyelid, and thereby, the operations in response to the plural patterns may be performed and the convenience may be improved.

Application Example 18

This application example of the invention is directed to the device according to any of Application Examples 13 to 17, wherein the control unit converts the respective patterns except some patterns of the respective patterns into the input information according to the predetermined rule, but does not convert the some patterns.

In the device, the control unit converts the instructions assigned to the respective patterns except some patterns of the patterns of the states of the eyelids into the input information according to the predetermined rule, but does not convert the instructions assigned to the some patterns. Accordingly, in the device, when the instructions assigned to the respective patterns are performed, execution of the instruction not intended by the user may be avoided.

Application Example 19

This application example of the invention is directed to the device according to Application Example 13, wherein the control unit inputs input data in response to the input information.

In the device, the control unit inputs input data in response to the input information in which the states of the eyelids detected by the detection unit are converted, and thereby, the user can input the input data without using hands and the operability may be improved.

Application Example 20

This application example of the invention is directed to the device according to any of Application Examples 13 to 19, which further includes an operation part that receives operations of the user, wherein the control unit converts combinations of the respective patterns and the operations into the input information according to the predetermined rule.

In the device, the control unit performs conversion into the input information according to the combinations with the operations received by the operation part in addition to the patterns of the states of the eyelids, and thereby, false detection of the states of eyelids may be prevented and the user may give instructions in more patterns.

Application Example 21

This application example of the invention is directed to the device according to any of Application Examples 13 to 20, wherein the detection unit detects the number of opened and closed times of the eyelids in a predetermined time, and the respective patterns include patterns defined by the number of opened and closed times of the eyelids in the predetermined time.

In the device, the detection unit detects the number of opened and closed times of the eyelids in the predetermined time and the patterns of the eyelids are defined by the number of opened and closed times, and thereby, the user may give instructions using simple state changes of the eyelids and the convenience may be improved.

Application Example 22

This application example of the invention is directed to the device according to any of Application Examples 13 to 21, wherein the detection unit interprets the case where the time in which the eyelids are closed is shorter than a predetermined value as the opened state of the eyelids of the states of the eyelids.

In the device, the detection unit interprets the case where the time in which the eyelids are closed is shorter than the predetermined value as the opened state of the eyelids of the states of the eyelids, and thereby, false detection of the states of the eyelids may be avoided without detection of eye blinks.

Application Example 23

This application example of the invention is directed to the device according to any of Application Examples 13 to 22, which further includes a sensing part that senses motions of a head of the user, wherein the control unit converts combinations of the respective patterns and the motions of the head into the input information according to the predetermined rule.

The device further includes the sensing part that senses motions of the head of the user, and the control unit performs conversion into input information according to the combinations of the respective patterns of the states of the eyelids and the sensed motions of the head of the user. Accordingly, in the device, the user can perform operation without using hands, false detection of the states of the eyelids may be prevented, and instructions in more patterns may be performed by the combinations with the motions of the head.

Application Example 24

This application example of the invention is directed to a head mounted display including an image display unit having an image light generation part that generates and outputs image light based on image data and a light guide part that guides the image light to eyes of a user and allowing the user to visually recognize a virtual image, and the device according to any of Application Examples 13 to 23 connected to the image display unit, and transmitting the image data to the image display unit and controlling image display by the image display unit.

Since the head mounted display includes the control unit and the image display unit, an image display with high portability may be realized.

Note that the aspects of the invention can be realized in various forms, for example, in the forms of a device and a control method of the device, a head mounted display and a control method of the head mounted display, a detection indicator, a state detection controller, an eyelid sensing controller, an information processing system, a head-mounted display system, a computer program for realization of functions of these methods, devices, or the systems, a recording medium in which the computer program is recorded, data signals including the computer program and embodied within carrier wave, or the like.

BRIEF DESCRIPTION OF THE DRAWINGS

The invention will be described with reference to the accompanying drawings, wherein like numbers reference like elements.

FIG. 8 is an explanatory diagram showing examples of functions in response to respective patterns of the eye lids of the user of the head mounted display 100 in the second embodiment.

FIG. 9 is an explanatory diagram showing examples of functions in response to respective patterns of the eye lids of the user of the head mounted display 100 in a modified example.

FIGS. 10A and 10B are explanatory diagrams showing examples of input data in response to states of the eye lids of the user of the head mounted display 100 in a modified example.

DESCRIPTION OF EXEMPLARY EMBODIMENTS

Figure 1:
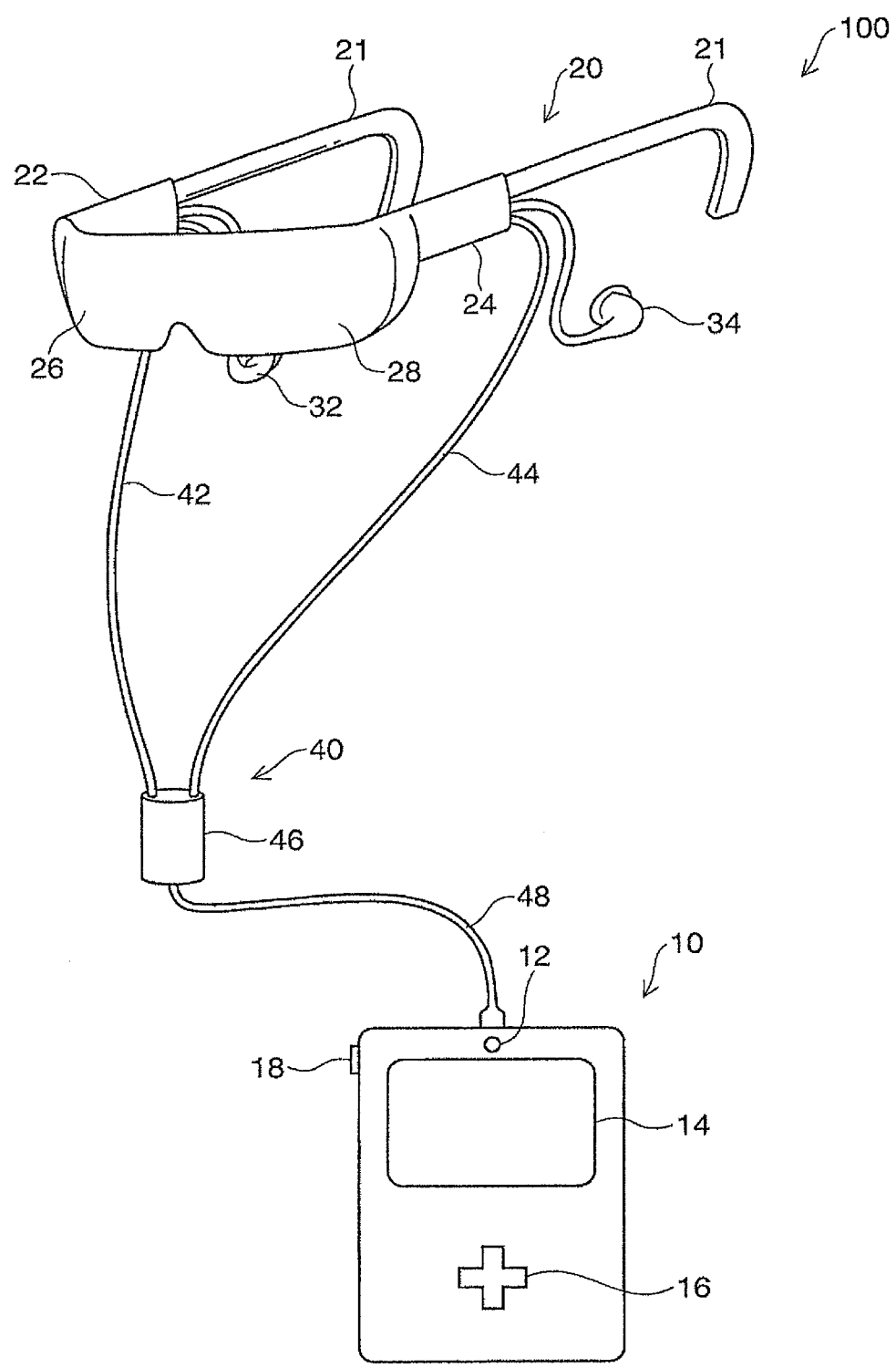
FIG. 1 is an explanatory diagram showing an outer configuration of a head mounted display 100 in the first embodiment of the invention.

Next, embodiments of the invention will be explained in the following order according to examples.
A. First Embodiment
A-1. Device Configuration
A-2. Control Processing
B. Second Embodiment
C. Modified Examples A. First Embodiment A-1. Device Configuration FIG. 1 is an explanatory diagram showing an outer configuration of a head mounted display 100 in the first embodiment of the invention. The head mounted display 100 is a display mounted on a head and also called an HMD. The head mounted display 100 of the embodiment is an optically transmissive head mounted display by which a user can visually recognize a virtual image and directly visually recognize an outside view.

The head mounted display 100 includes an image display unit 20 that allows the user to visually recognize a virtual image when the display is mounted on the head of the user, and a control unit (controller) 10 that controls the image display unit 20.

The image display unit 20 is a mounted body mounted on the head of the user and has an eyeglasses shape in the embodiment. The image display unit 20 has ear-fit parts 21 that function as temples, and a right optical panel 26 and a left optical panel 28 located in front of the right and left eye of the user, respectively, when the user wears the image display unit 20. Further, a right display drive unit 22 is provided in the connection part of the ear-fit part 21 for right ear and the right optical panel 26, and a left display drive unit 24 is provided in the connection part of the ear-fit part 21 for left ear and the left optical panel 28. In the following explanation, the right optical panel 26 and the left optical panel 28 are collectively simply referred to as "optical panels 26, 28".

The image display unit 20 further has a right earphone 32 for right ear and a left earphone 34 for left ear. The right earphone 32 and the left earphone 34 are worn on the right and left ears, respectively, when the user wears the image display unit 20.

The image display unit 20 further has a connection unit 40 for connecting the image display unit 20 to the control unit 10. The connection unit 40 includes a main cable 48 connected to the control unit 10, a right cable 42 and a left cable 44 formed by branching the main cable 48 into two, and a coupling part 46 provided at the branch point. The right cable 42 is connected to the right display drive unit 22 and the left cable 44 is connected to the left display drive unit 24. The image display unit 20 and the control unit 10 perform transmission of various signals via the connection unit 40. Connectors (not shown) mating each other are provided respectively at the end opposite to the coupling part 46 in the main cable 48 and the control unit 10, and the control unit 10 and the image display unit 20 are connected or disconnected by mating or demating of the connecter of the main cable 48 and the connector of the control unit 10.

The control unit 10 is a device that controls image display by the image display unit 20. The control unit 10 has a power switch 18 that switches ON/OFF of power, a lighting part 12 that indicates the operation states of the head mounted display 100 (for example, the ON/OFF states of power) by light emission, a touch pad 14 that detects a finger operation of the user and outputs a signal in response to the finger operation, and a cross key 16 that detects pressing operation of the key corresponding to the vertical and horizontal directions and outputs a signal in response to the operation. As the lighting part 12, for example, one or plural LED lamps may be used. As the touch pad 14, various touch pads of electrostatic type, pressure detection type, or optical type may be employed.

Figure 2:
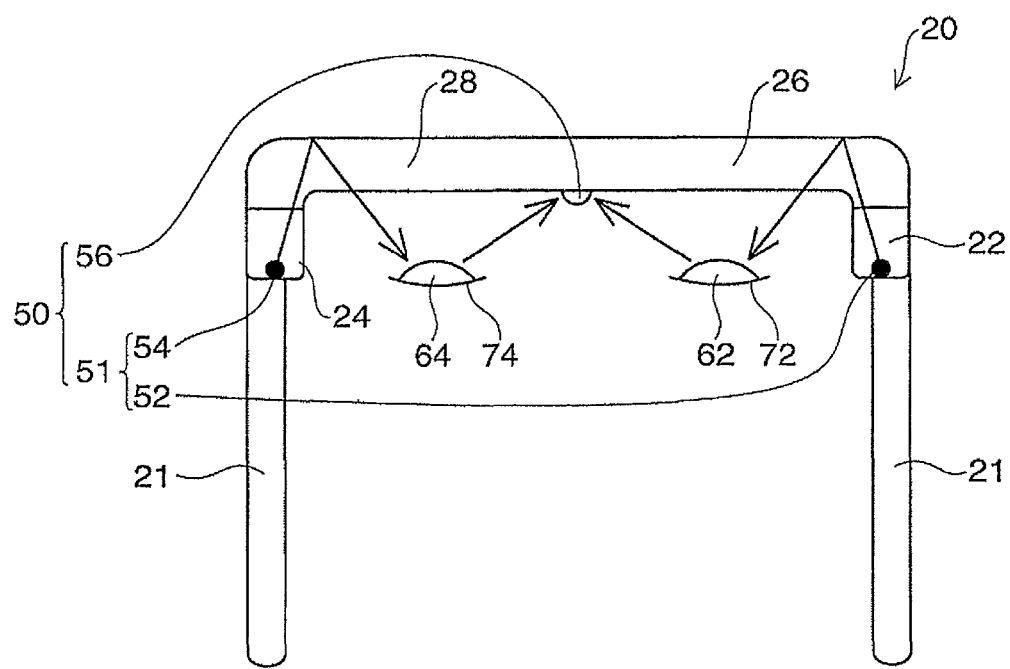
FIG. 2 is an explanatory diagram showing a detailed configuration of an image display unit 20.

FIG. 2 is an explanatory diagram showing a detailed configuration of the image display unit 20. The image display unit 20 has an infrared sensor 50 that detects states of eyelids of the user. The infrared sensor 50 has an infrared light emitting part 51 that outputs infrared lights toward eyes of the user and an infrared light receiving part 56 that receives infrared lights reflected by the eyes of the user. The infrared light emitting part 51 has a right infrared light emitting part 52 that outputs infrared light toward the right eye of the user and a left infrared light emitting part 54 that outputs infrared light toward the left eye of the user. The right infrared light emitting part 52 is provided in the right display drive unit 22 and the left infrared light emitting part 54 is provided in the left display drive unit 24. The infrared light receiving part 56 is provided in the boundary part in the middle of the right optical panel 26 and the left optical panel 28.

The infrared light output from the right infrared light emitting part 52 is reflected by a right light guide plate 261, which will be described later, included in the image display unit 20, and enters the right eye 62 of the user. The infrared reflected light from the right eye 62 of the incident light reaches the infrared light receiving part 56 and is detected by the infrared sensor 50. The infrared light output from the left infrared light emitting part 54 is the same as the infrared light output from the right infrared light emitting part 52, and the explanation is omitted here. Since the reflectance of the infrared light is different between the state in which the user's eyes are opened and the state in which the user's eyes are closed, and output values are different in the infrared light receiving part 56. Accordingly, the infrared sensor 50 may determine the state in which the user's eyes are opened and the state in which the user's eyes are closed.

Figure 3:
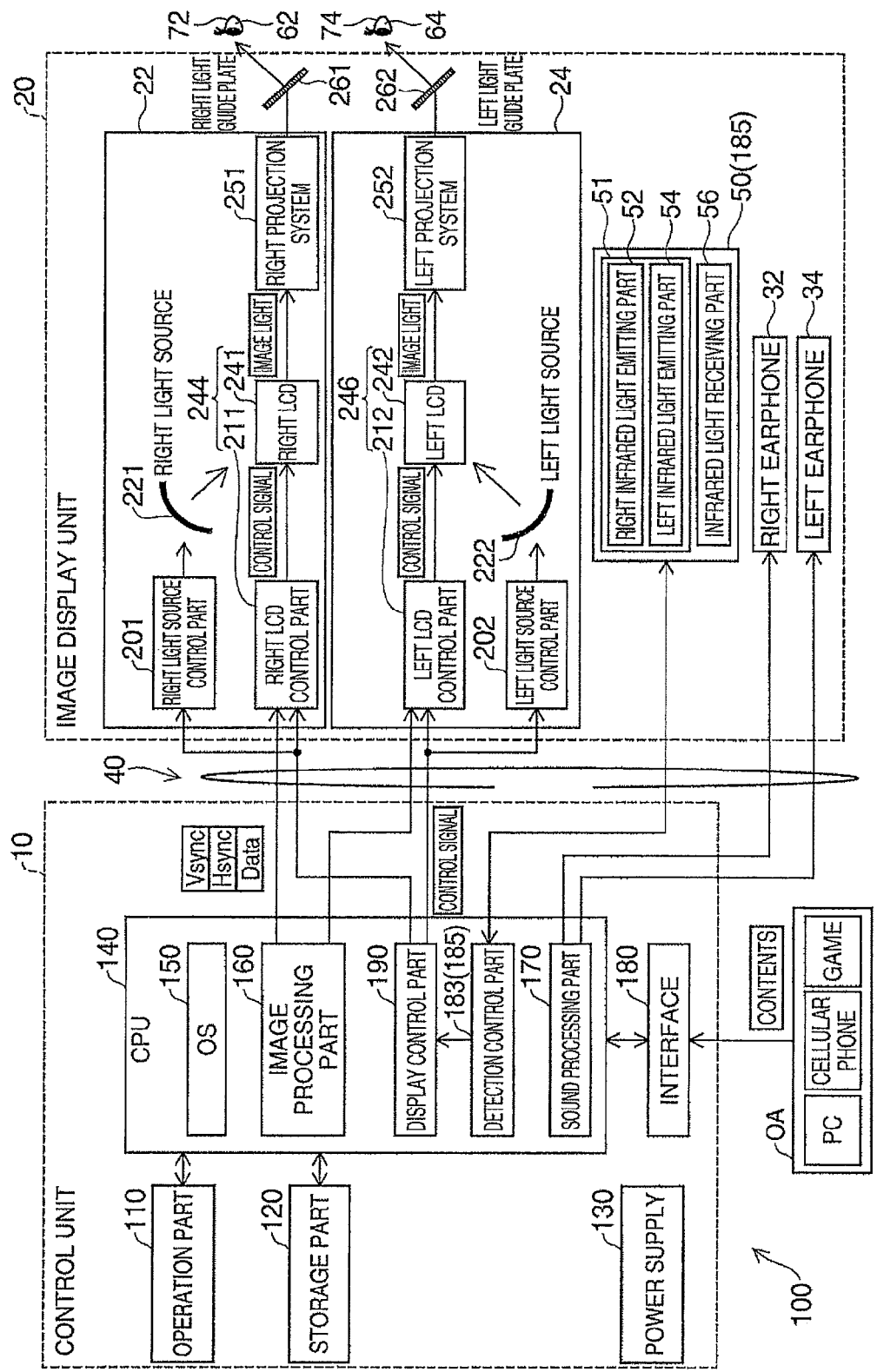
FIG. 3 is an explanatory diagram functionally showing a configuration of the head mounted display 100.

FIG. 3 is an explanatory diagram functionally showing a configuration of the head mounted display 100. As shown in FIG. 3, the control unit 10 has a CPU 140, a storage part 120 including a ROM, RAM, or the like, a power supply 130 that supplies power to the respective units of the head mounted display 100, an operation part 110 to be operated by the user (in this embodiment, the touch pad 14, the cross key 16, the power switch 18), and an interface 180 for connection to various external equipment OA (for example, a personal computer, a cellular phone terminal, and a game terminal) as supply sources of contents data such as images (still images, moving images) and sound. As the power supply 130, for example, a secondary cell may be used, and, as the interface 180, for example, a USB interface, an interface for memory card, a wireless LAN interface, or the like may be employed.

In the storage part 120, various computer programs are stored, and the CPU 140 reads out the computer programs from the storage part 120 and executes them, and thereby, functions as an operating system (OS) 150, an image processing part 160, a display control part 190, a detection control part 183, and a sound processing part 170.

The image processing part 160 generates a vertical synchronizing signal VSync, a horizontal synchronizing signal HSync, and image data Data based on the contents data input via the interface 180, and supply the signals to the image display unit 20 via the connection unit 40. Specifically, the image processing part 160 generates the image data Data by acquiring image signals (for example, analog signals including 30 frame images per second) contained in the contents data, separating the synchronizing signals of the vertical synchronizing signal VSync, the horizontal synchronizing signal HSync, etc. from the acquired image signals, and converting the analog image signals from which the synchronizing signals have been separated into digital image signals. Note that the image processing part 160 may execute resolution conversion processing, color compensation processing, etc. on the image data according to need.

The detection control part 183 is connected to the infrared sensor 50, and detects the output values of the infrared light received by the infrared light receiving part 56. Further, the detection control part 183 controls infrared light emission of the infrared light emitting part 51. The detection control part 183 determines the state in which the user's eyes are opened and the state in which the user's eyes are closed based on the output values in the infrared light receiving part 56. According to the determination, the detection control part 183 generates a control signal and supplies the control signal to the display control part 190. Note that the detection control part 183 and the infrared sensor correspond to a detection unit (detection part 185) according to the invention.

The display control part 190 receives the control signal from the detection part 185 or the like, generates control signals for controlling the right display drive unit 22 and the left display drive unit 24, supplies the signals to the image display unit 20 via the connection unit 40, and thereby, controls an image display condition in the image display unit 20. Specifically, the display control part 190 individually controls drive ON/OFF of a right LCD 241 by a right LCD control part 211 and drive ON/OFF of a right light source 221 by a right light source control part 201 and drive ON/OFF of a left LCD 242 by a left LCD control part 212 and drive ON/OFF of a left light source 222 by a left light source control part 202 using the generated control signals, and thereby, controls generation or non-generation of the respective image lights by the right display drive unit 22 and the left display drive unit 24. For example, the display control part 190 allows both the right display drive unit 22 and the left display drive unit 24 to generate image lights, only one of them to generate an image light, or both of them to generate no image light.

The sound processing part 170 acquires sound signals contained in the contents data, amplifies the acquired sound signals, and supplies the signals to the right earphone 32 and the left earphone 34 of the image display unit 20 via the connection unit 40.

The right display drive unit 22 of the image display unit 20 has the right light source 221 including an LED lamp, for example, the right light source control part 201 that drives the right light source 221 based on the control signal supplied from the control unit 10, the right liquid crystal display (LCD) 241 that converts the light output from the right light source 221 into image light representing an image, and the right LCD control part 211 that drive-controls the right LCD 241 based on the vertical synchronizing signal VSync, the horizontal synchronizing signal HSync, and the image data Data supplied from the control unit 10. The right LCD 241 includes a transmissive liquid crystal panel, for example. The right LCD 241 and the right LCD control part 211 form a right-eye image generation part 244. The right display drive unit 22 has a right projection system 251 that projects the generated image light. The right projection system 251 includes a collimater lens, for example.

The right optical panel 26 (FIG. 1) of the image display unit 20 has the right light guide plate 261, and the right light guide plate 261 guides the image light output from the right projection system 251 to the right eye 62 (FIG. 2) of the user while reflecting it along a predetermined optical path. Note that the right projection system 251 and the right light guide plate 261 correspond to a light guide part according to the invention.

The left display drive unit 24 includes the left light source 222, the left light source control part 202, the left LCD 242, the left LCD control part 212, and a left projection system 252 like the right display drive unit 22. The configurations and functions of the respective elements included in the left display drive unit 24 are the same as those of the respective elements included in the right display drive unit 22, and their explanation is omitted here. Further, the left optical panel 28 of the image display unit 20 has a left light guide plate 262, and the left light guide plate 262 guides the image light output from the left projection system 252 to the left eye 64 (FIG. 2) of the user while reflecting it along a predetermined optical path. The left LCD 242 and the left LCD control part 212 form a left-eye image generation part 246. The left projection system 252 and the left light guide plate 262 correspond to the light guide part according to the invention. As below, the right light source control part 201 and the left light source control part 202 are also collectively simply referred to as "light source control parts 201, 202", the right light source 221 and the left light source 222 are also collectively simply referred to as "light sources 221, 222", and the right-eye image generation part 244 and the left-eye image generation part 246 are also collectively simply referred to as "image generation parts 244, 246". Note that the light sources 221, 222 and the image generation parts 244, 246 correspond to an image light generation part according to the invention.

Figure 4:
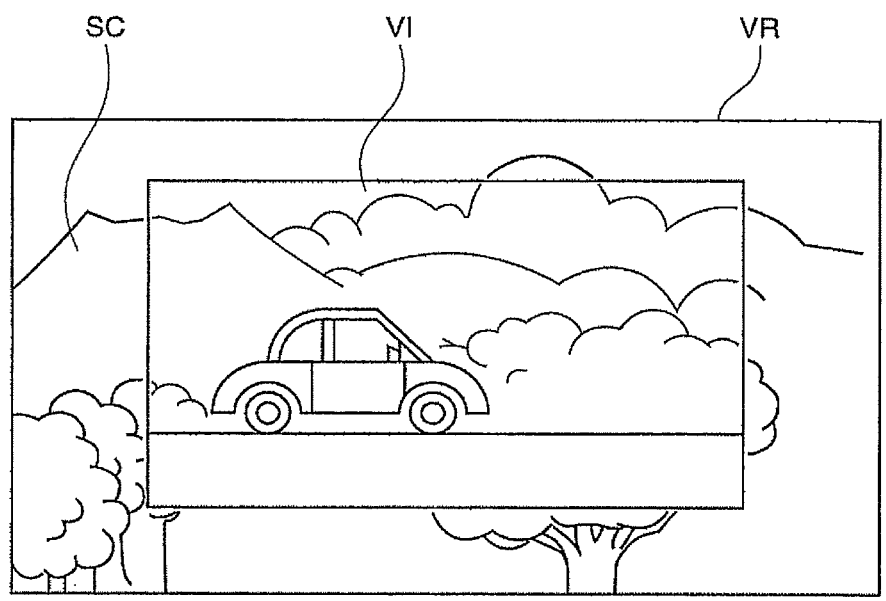
FIG. 4 is an explanatory diagram showing an example of a virtual image to be recognized by a user.

In this manner, the image lights guided to the eyes of the user of the head mounted display 100 are imaged on the retinas, and thereby, the user visually recognize the virtual image. FIG. 4 is an explanatory diagram showing an example of a virtual image to be recognized by a user. As shown in FIG. 4, the virtual image VI is visually recognized within a field of view VR of the user of the head mounted display 100. Further, of the field of view VR of the user, with respect to the parts except the part in which the virtual image VI is visually recognized, the user can see the outside view SC through the right optical panel 26 and the left optical panel 28. Note that, in the head mounted display 100 of the embodiment, the outside view SC may be seen through on the background of the virtual image VI with respect to the part in which the virtual image VI is visually recognized of the field of view VR of the user.

Note that the right optical panel 26 and the left optical panel 28 may be provided at the front side of the right light guide plate 261 and the left light guide plate 262 (at the opposite side to the eyes of the user), and may have dimming plates that can adjust light transmittance. If the dimming plates are provided, ease of visual recognition of the virtual image may be adjusted by adjusting the light transmittance of the dimming plates and adjusting the amount of external light entering the eyes of the user.

A-2. Control Processing

Figure 5:
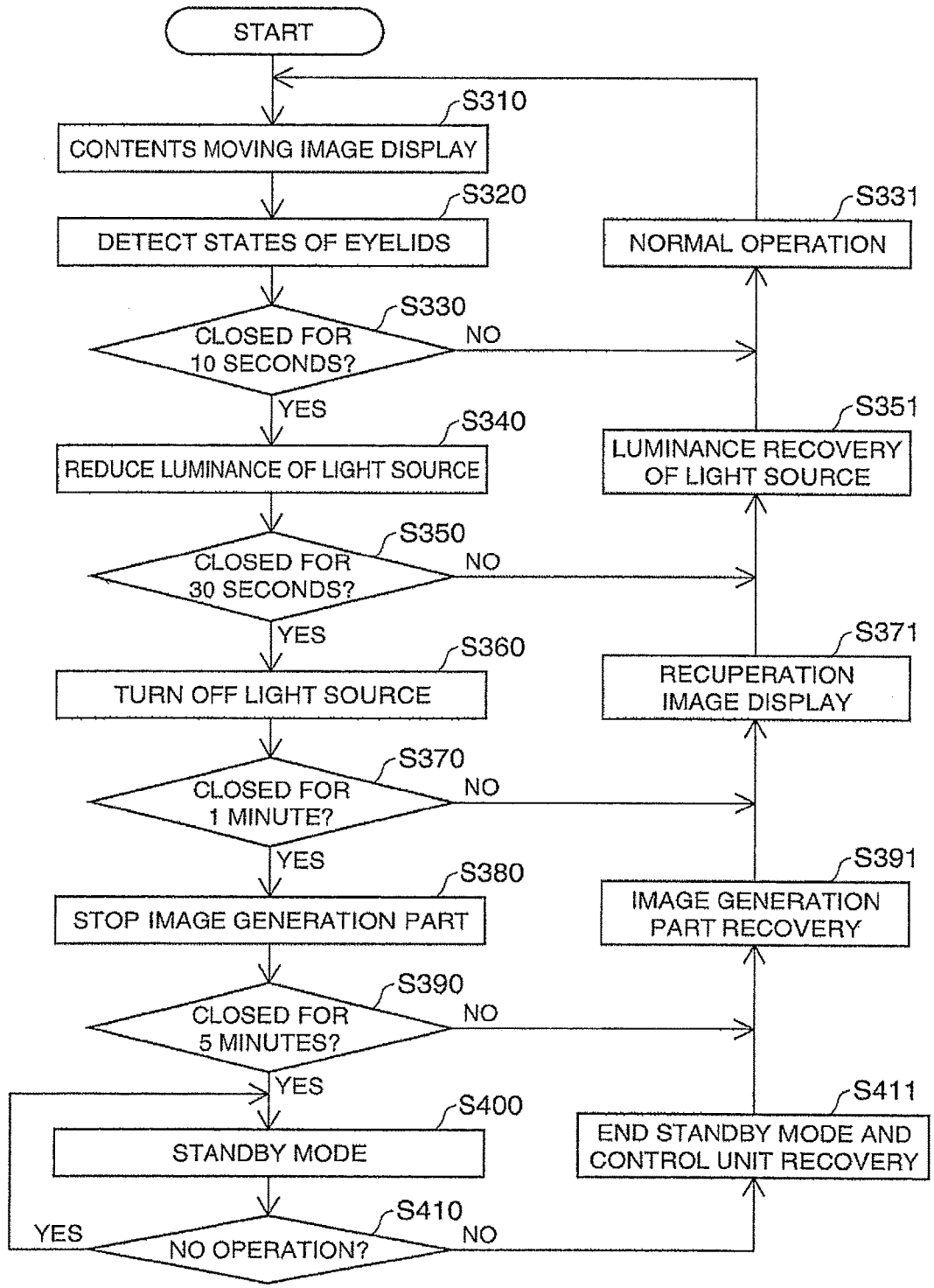
FIG. 5 is a flowchart showing a flow of control processing of the head mounted display 100 in the first embodiment.

FIG. 5 is a flowchart showing a flow of control processing of the head mounted display 100 in the first embodiment. When the head mounted display 100 of the embodiment is used, contents data of moving pictures, images, etc. is supplied from the external equipment OA connected via the interface 180 to the CPU 140. The display control part 190 generates control signals based on the supplied contents data. The control signals are supplied to the light source control parts 201, 202 and the image generation parts 244, 246. The light source control parts 201, 202 increase or decrease the luminance of the light sources 221, 222 based on the supplied control signals. The image generation parts 244, 246 convert the lights output from the light sources 221, 222 into image lights based on the supplied control signals. The left projection system 252 and the left light guide plate 262 guide the image lights to the eyes of the user. The image lights are visually recognized as a virtual image by the user, and the sound processing part 170 included in the CPU 140 reproduces the sound of the contents supplied from the external equipment OA (step S310). Note that, in the embodiment, the head mounted display 100 is the transmissive head mounted display, and thus, the user can see through the outside view SC on the background of the virtual image VI.

When the head mounted display 100 operates, the detection part 185 detects the states of the eyelids (the opened and closed states of the eyelids) of the user (step S320). While the user views the contents supplied from the external equipment OA, the detection part 185 may detect the eyelids of the user kept closed. At this time, it is considered possible that the user is asleep. Accordingly, in the embodiment, the control unit 10 and the display control part 190 switch the operation mode in response to the opened and closed states of the eyelids of the user detected by the detection part 185.

While the detection part 185 does not detect the eyelids of the user kept closed for 10 seconds or more (step S330: NO), the part determines that the user is not asleep and the normal operation of the head mounted display 100 is continued (step S331).

At the normal operation of the head mounted display 100, if the detection part 185 detects the eyelids of the user kept closed for 10 seconds or more (step S330: YES), the part determines that the user is asleep. At this time, the display control part 190 reduces the luminance of the light sources 221, 222 (step S340). By reducing the lights output from the light sources 221, 222, the head mounted display 100 transits to the operation mode with lower power consumption. The transition is called power-saving transition.

In the embodiment, the display control part 190 separately controls the right light source control part 201 and the left light source control part 202. The right light source control part 201 controls the right light source 221 and the left light source control part 202 controls the left light source 222. Accordingly, the display control part 190 may reduce the luminance of only one of the right light source 221 and the left light source 222. Further, the display control part 190 may separately reduce the luminance of the right light source 221 and the left light source 222.

If the detection part 185 detects the eyelids of the user opened within 30 seconds after the luminance of the light sources 221, 222 is reduced (step S350: NO), the part determines the user has awaken from his or her sleep. At this time, the display control part 190 maximizes the luminance of the light sources 221, 222 (step S351). By maximizing the luminance of the light sources 221, 222, the head mounted display 100 transits to the operation mode with higher power consumption. The transition is called recovery transition. Then, the display control part 190 transits to the normal operation (step S331). Note that it is not necessary that the increased amount of luminance of the light sources 221, 222 is equal to the reduced amount of luminance of the light sources 221, 222 in the processing at step S340. Further, the display control part 190 may gradually increase the luminance of the light sources 221, 222 with the passage of time.

If the detection part 185 detects the eyelids of the user continuously kept closed for 30 seconds or more after the luminance of the light sources 221, 222 has been reduced (step S350: YES), the part determines that the user remains asleep. At this time, the display control part 190 turns off the light sources 221, 222 (step S360). Thereby, the head mounted display 100 performs power-saving transition to the operation mode with much lower power consumption.

If the detection part 185 detects the eyelids of the user opened within one minute after the light sources 221, 222 have been turned off (step S370: NO), the part determines the user has awaken from his or her sleep. At this time, the display control part 190 allows the image display unit 20 to display a recuperation image (for example, an image with lower brightness) (step S371). Then, the display control part 190 maximizes the luminance of the light sources 221, 222 (step S351) and transits to the normal operation (step S331). Thereby, the head mounted display 100 performs recovery transition to the operation mode with higher power consumption. Note that, in the embodiment, if the luminance of the light sources 221, 222 increases in a short time from the off-state, the display control part 190 allows the image display unit 20 to display the recuperation image because the eyes of the user are significantly strained. Note that the display control part 190 may increase the luminance of the light sources 221, 222 in a short time without displaying the recuperation image, or gradually increase the luminance of the light sources 221, 222 with the passage of time.

When the light sources 221, 222 are off, if the detection part 185 detects the eyelids of the user continuously kept closed for one minute or more (step S370: YES), the part determines that the user remains asleep. At this time, the display control part 190 stops the operations of the image generation parts 244, 246 (step S380). Thereby, the head mounted display 100 performs power-saving transition to the operation mode with still much lower power consumption.

In the embodiment, the display control part 190 separately controls the right-eye image generation part 244 and the left-eye image generation part 246. Accordingly, the display control part 190 can stop the operation of only one of the right-eye image generation part 244 and the left-eye image generation part 246.

If the detection part 185 detects the eyelids of the user opened within five minutes after the operations of the image generation parts 244, 246 have been stopped (step S390: NO), the part determines the user has awaken from his or her sleep. At this time, the display control part 190 starts the operations of the image generation parts 244, 246 again (step S391). Then, the display control part 190 allows the image display unit 20 to display the recuperation image (step S371), maximizes the luminance of the light sources 221, 222 (step S351), and transits to the normal operation (step S331). Thereby, the head mounted display 100 performs recovery transition to the operation mode with the higher power consumption.

If the detection part 185 detects the eyelids of the user continuously kept closed for five minutes or more after the operations of the image generation parts 244, 246 have been stopped (step S390: YES), the part determines that the user remains asleep. At this time, the control unit 10 stops the operations of the image processing part 160, the display control part 190, the detection control part 183, and the sound processing part 170 (step S400). Thereby, the head mounted display 100 performs power-saving transition to the operation mode with even still much lower power consumption. Note that the operation mode in which the operations of the image processing part 160, the display control part 190, the detection control part 183, and the sound processing part 170 are stopped is called "standby mode". Further, the image processing part 160, the display control part 190, the detection control part 183, and the sound processing part 170 correspond to the respective ones of functional parts that realize the plural functions of the control unit 10 according to the invention.

In the standby mode, unless the power switch 18 of the operation unit 110 is pressed down, the detection part 185 determines the user remains asleep and the standby mode is continued (step S410: NO).

In the standby mode, if the power switch 18 of the operation unit 110 is pressed down (step S410: YES), the control unit 10 determines the user has awaken from his or her sleep. At this time, the control unit 10 ends the standby mode and the operations of the image processing part 160, the display control part 190, the detection control part 183, and the sound processing part 170 are started again (step S411). Then, the display control part 190 allows the image display unit 20 to display the recuperation image (step S371), maximizes the luminance of the light sources 221, 222 (step S351), and transits to the normal operation (step S331). Thereby, the head mounted display 100 performs recovery transition to the operation mode with the higher power consumption.

Further, in the embodiment, the storage part 120 has stored the information of the images of the contents data that the display control part 190 had allowed the image display unit 20 to display before transition to the standby mode. Accordingly, when the control unit 10 ends the standby mode, the operations of the image processing part 160, the display control part 190, the detection control part 183, and the sound processing part 170 are started again, and the display control part 190 may restart from where interrupted based on the information of the images of the contents data stored in the storage part 120.

As described above, in the head mounted display 100 according to the invention, the detection part 185 detects the opened and closed states of the eyelids of the user. The display control part 190 increases or decreases the luminance of the light sources 221, 222 and controls the operations of the image generation parts 244, 246 in response to the opened and closed states of the eye lids. Further, the control unit 10 transits to the standby mode or ends the standby mode in response to the opened and closed states of the eye lids. The display control part 190 determines the user is asleep if the detection part 185 detects the eyelids of the user kept closed in a predetermined time. At this time, the display control part 190 and the control unit 10 perform the power-saving transition. In the embodiment, as the power-saving transition, the display control part 190 reduces the luminance of the light sources 221, 222 and stops the operations of the image generation parts 244, 246. Further, the control unit 10 transits to the standby mode. On the other hand, in the operation mode with the lower power consumption than that of the normal operation, if the detection part 185 does not detect the eyelids of the user kept closed in the predetermined time, the part determines the user has awaken from his or her sleep. At this time, the display control part 190 and the image display unit 20 perform the recovery transition. In the embodiment, as the recovery transition, the display control part 190 increases the luminance of the light sources 221, 222 and starts the operations of the image generation parts 244, 246 again. The control unit 10 ends the standby mode. Therefore, in the head mounted display 100 of the embodiment, the display control part 190 and the control unit 10 switch to the appropriate modes with different power consumption in response to the detected opened and closed states of the eyelids of the user, which may suppress the power consumption.

Further, in the head mounted display 100 of the embodiment, at the normal operation, if the detection part 185 detects the eyelids of the user kept closed for 10 seconds or more, the part determines that the user is asleep. At this time, the display control part 190 reduces the luminance of the light sources 221, 222. Furthermore, when the luminance of the light sources 221, 222 is reduced, if the detection part 185 detects the eyelids of the user continuously kept closed for 30 seconds or more, the part determines that the user remains asleep. At this time, the display control part 190 turns off the light sources 221, 222. Therefore, the head mounted display 100 reduces the luminance of the light sources 221, 222 and transits to the operation mode with the lower power consumption when the user is asleep, which may reduce the power consumption.

In addition, in the head mounted display 100 of the embodiment, when the light sources 221, 222 are off, if the detection part 185 detects the eyelids of the user continuously kept closed for one minute or more, the part determines that the user remains asleep. At this time, the display control part 190 stops the operations of the image generation parts 244, 246. Therefore, the head mounted display 100 stops the operations of the image generation parts 244, 246 and transits to the operation mode with still much lower power consumption when the user remains asleep, which may reduce the power consumption.

Further, in the head mounted display 100 of the embodiment, when the operations of the image generation parts 244, 246 are stopped, if the detection part 185 detects the eyelids of the user continuously kept closed for five minutes or more, the part determines that the user remains asleep. At this time, the control unit 10 transits to the standby mode. Therefore, the head mounted display 100 stops the operations of the image processing part 160, the display control part 190, the detection control part 183, and the sound processing part 170 and transits to the operation mode with even still much lower power consumption when the user remains asleep, which may reduce the power consumption.

Furthermore, as described above, the head mounted display 100 of the embodiment performs the power-saving transition in a stepwise manner in response to the time in which the eyelids of the user are kept closed. It may be considered that the user is more likely to wake up when the elapsed time after the eyelids of the user are closed is shorter than when the elapsed time is longer. It is desirable that, when the user wakes up, the time taken for recovery transition to the normal operation is shorter. Therefore, the head mounted display 100 transits to the operation modes with lower power consumption in a stepwise manner in response to the elapsed time after the eyelids of the user are closed, which may promptly recover to the normal operation while reducing the power consumption.

In addition, in the head mounted display 100 of the embodiment, when the luminance of the light sources 221, 222 is reduced, if the detection part 185 does not detect the eyelids of the user kept closed for further 30 seconds or more, the part determines the user has awaken from his or her sleep. At this time, the display control part 190 maximizes the luminance of the light sources 221, 222. Further, when the light sources 221, 222 are off, if the detection part 185 does not detect the eyelids of the user kept closed for further one minute or more, the part determines the user has awaken from his or her sleep. At this time, the display control part 190 allows the image display unit 20 to display the recuperation image. Then, the display control part 190 maximizes the luminance of the light sources 221, 222. Therefore, the head mounted display 100 may reduce the power consumption when the user is asleep and may promptly recover to the normal operation when the user awakes from his or her sleep.

Further, in the head mounted display 100 of the embodiment, when the operations of the image generation parts 244, 246 are stopped, if the detection part 185 does not detect the eyelids of the user opened for further five minutes or more, the part determines the user has awaken from his or her sleep. At this time, the display control part 190 starts the operations of the image generation parts 244, 246 again. Then, the display control part 190 allows the image display unit 20 to display the recuperation image and maximizes the luminance of the light sources 221, 222. Therefore, the head mounted display 100 may reduce the power consumption when the user is asleep and may promptly recover to the normal operation when the user awakes from his or her sleep.

Furthermore, in the head mounted display 100 of the embodiment, in the standby mode, if the power switch 18 of the operation unit 110 is pressed down, the control unit 10 determines the user has awaken from his or her sleep. At this time, the control unit 10 ends the standby mode and the operations of the image processing part 160, the display control part 190, the detection control part 183, and the sound processing part 170 are started again. Then, the display control part 190 allows the image display unit 20 to display the recuperation image and maximizes the luminance of the light sources 221, 222. Therefore, the head mounted display 100 may reduce the power consumption when the user is asleep and may promptly recover to the normal operation when the user awakes from his or her sleep.

In addition, the head mounted display 100 performs recovery transition in a stepwise manner in response to the time in which the eyelids of the user are kept closed as described above. It may be considered that the sleep of the user is deeper when the elapsed time after the eyelids of the user are closed is longer. Accordingly, when the detection part 185 detects the eyelids of the user opened from the closed state, if the luminance of the light sources 221, 222 increases in a short time, the eyes of the user are significantly strained. Therefore, the head mounted display 100 performs the recovery transition in the stepwise manner, and thereby, the eyes of the user are less strained.

Further, in the head mounted display 100 of the embodiment, the image processing part 160 stores the information of the contents that the display control part 190 have allowed the image display unit 20 to display in the storage part 120 before transition to the standby mode. The information of the contents includes frame numbers or frame data, for example. Accordingly, when the control unit 10 ends the standby mode, the operations of the image processing part 160, the display control part 190, the detection control part 183, and the sound processing part 170 are started again, and the display control part 190 may restart from where interrupted based on the information of the images of the contents stored in the storage part 120. Therefore, in the head mounted display 100, the user may efficiently restart the contents intended to view.

Furthermore, in the head mounted display 100 of the embodiment, the display control part 190 separately controls the right light source control parts 201 and the left light source control part 202. The right light source control part 201 controls the right light source 221 and the left light source control part 202 controls the left light source 222. Accordingly, the display control part 190 may reduce the luminance of only one of the right light source 221 and the left light source 222. Further, the display control part 190 separately controls the right-eye image generation part 244 and the left-eye image generation part 246. Accordingly, the display control part 190 can stop the operation of only one of the right-eye image generation part 244 and the left-eye image generation part 246. Therefore, the head mounted display 100 separately controls the right light source 221 and the left light source 222 and the right-eye image generation part 244 and the left-eye image generation part 246, which may realize flexible reduction of power consumption.

B. Second Embodiment

Figure 6:
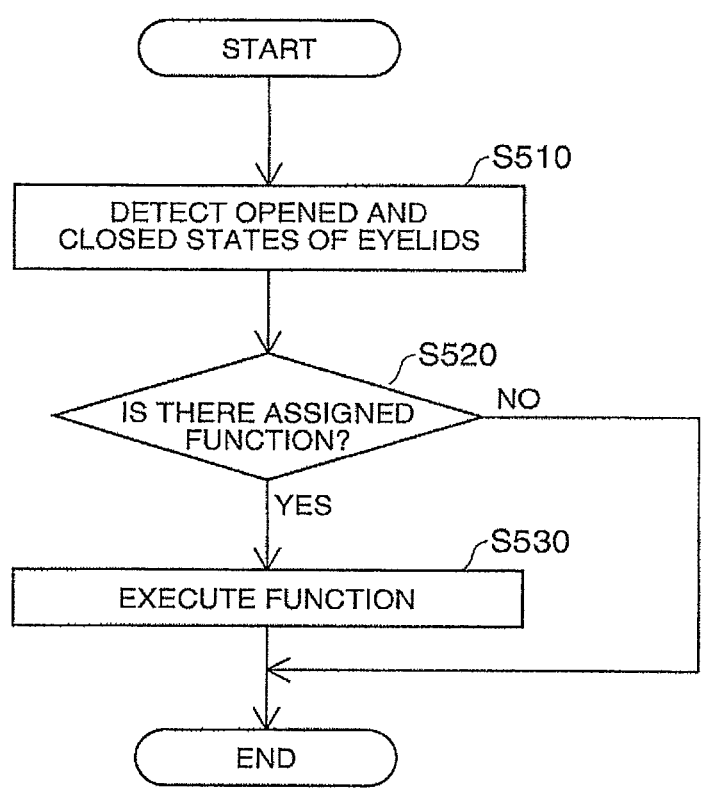
FIG. 6 is a flowchart showing a flow of control processing of the head mounted display 100 in a second embodiment.

FIG. 6 is a flowchart showing a flow of control processing of the head mounted display 100 in the second embodiment. The head mounted display 100 in the second embodiment is adapted to be operated by the user using eyelids without using hands. The control processing is processing by the head mounted display 100 of performing control in response to the operation using the eyelids of the user.

Figure 7A:
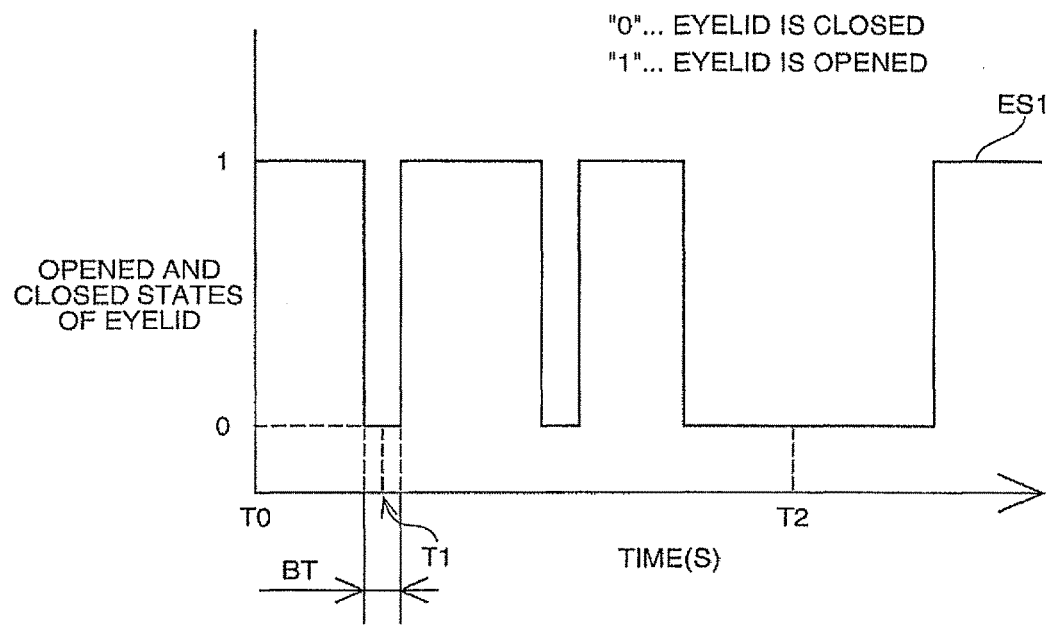
FIGS. 7A and 7B are explanatory diagrams showing relationships between time and opened and closed states of eye lids in the second embodiment.
Figure 7B:
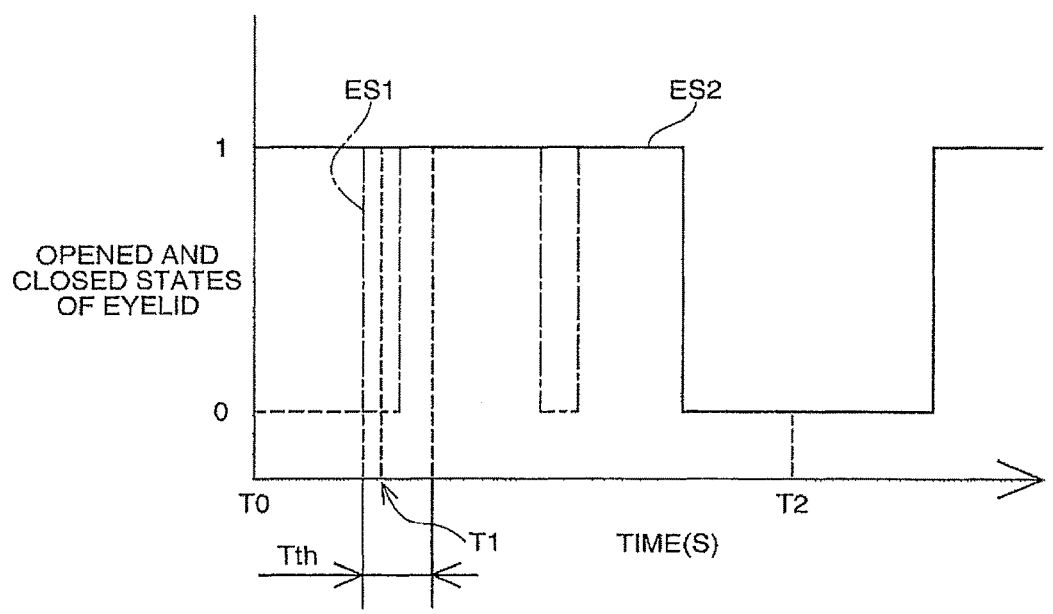

In the control processing of the head mounted display 100, the detection part 185 detects opened and closed states of the right eyelid 72 (FIG. 2) of the right eye 62 and the left eyelid 74 of the left eye 64 (step S510). FIGS. 7A and 7B are explanatory diagrams showing relationships between time and opened and closed states of eye lids in the second embodiment. FIG. 7A shows an example of a detected open/close signal ES1 representing the opened and closed states of the right eyelid 72 (or the left eyelid 74) in the respective times detected by the infrared sensor 50. FIG. 7B shows an example of an interpreted open/close signal ES2 representing the opened and closed states of the right eyelid 72 (or the left eyelid 74) in the respective times interpreted by the detection control part 183 that has received the detection result by the infrared sensor 50. FIG. 7B also shows the detected open/close signal ES1 by dashed-dotted lines for reference. In FIGS. 7A and 7B, the state in which the eyelid is closed is indicated by "0" and the state in which the eyelid is opened is indicated by "1". Note that, as shown in FIG. 3, the infrared sensor 50 and the detection control part 183, i.e., the detection part 185 is attached to the image display unit 20, however, is part of the configuration of the control unit 10.

Usually, the user of the head mounted display 100 opens both eyelids. The infrared sensor 50 constantly detects the opened and closed states of the eyelids of the user and output signals representing the opened and closed states of the eyelids (the detected open/close signals ES1 shown in FIG. 7A) to the detection control part 183. The detection control part 183 determines the opened and closed states of the eyelids of the user based on the detected open/close signals ES1, and, for example, if the state in which only one of the right eyelid 72 and the left eyelid 74 of the user is closed is detected, with the detection time as the start time T0, detects the opened and closed states of the respective eyelids at the first detection time T1 0.5 seconds after the start time T0 and at the second detection time T2 further one second after. Note that, although the time from the start time T0 to the first detection time T1 has been set to 0.5 seconds and the time from the first detection time T1 to the second detection time T2 has been set to one second, the times are not limited to the values, but the times may be set freely by the user.

FIGS. 7A and 7B show the examples in which the user of the head mounted display 100 of the second embodiment performs operation of opening the eyelid at the first detection time T1 and closing the eyelid at the second detection time T2.

Usually, the user of the head mounted display 100 may unconsciously blink even when performing operation of opening the eyelids. The section of the time BT shown in FIG. 7A is a section in which the eyelid is closed by blinking. As shown in FIG. 7A, if the first detection time T1 overlaps with the section of the blink time BT, the infrared sensor 50 detects the state in which the eyelid is closed at the first detection time T1.

As shown in FIG. 7B, the detection control part 183 converts the detected open/close signal ES1 detected by the infrared sensor 50 into the interpreted open/close signal ES2. In order not to determine the eyelid closed even when detecting an eye blink, the detection control part 183 determines an eye blink if the time in which the eyelid is closed is shorter than a preset threshold value Tth and determines the opened state, not the closed state of the eyelid. In the head mounted display 100 in the second embodiment, the preset threshold value Tth is set to 0.3 seconds in consideration of the blink time BT (0.10-0.15 seconds), and the detection control part 183 interprets the detection results to remove the eye blinks from the opened and closed states of the eyelids and the detection part 185 detects the opened and closed states of the eyelids. Note that the preset threshold value Tth is not limited to 0.3 seconds.

After the detection part 185 detects the opened and closed states of the eyelids, the display control part 190 determines whether or not the respective patterns combining the opened and closed states of the right eyelid 72 and the left eyelid 74 at the first detection time T1 and the second detection time T2 have assigned functions (step S520).

FIG. 8 is an explanatory diagram showing examples of functions in response to the respective patterns of the eye lids of the user of the head mounted display 100 in the second embodiment. The detection part 185 detects the opened and closed states of the right eyelid 72 and the left eyelid 74 at the first detection time T1 and the second detection time T2, and thus, there are 16 patterns of the opened and closed states of the eyelids from pattern P01 to pattern P16.

As shown in FIG. 8, there are patterns having assigned functions and patterns having no assigned functions. For example, the pattern P16 is the same as the normal state in which the eyelids of the eyes are constantly opened, and thus, it is preferable not to assign any function to the pattern P16. Further, the difference in opened and closed states of eyelids between the pattern P03 and the pattern P04 is in that the left eyelid 74 changes from the opened state to the closed state at the second detection time T2 or remains closed. In the case where the function assigned to the pattern P03 is executed, if the left eyelid 74 is held opened to the second detection time T2, the display control part 190 converts the function into a control signal for the function assigned to the pattern P04 and supplies it to the image display unit 20. Accordingly, in the head mounted display 100 of the second embodiment, the function different from the function intended by the user may be executed, and thus, it is preferable not to assign any function to one of the pattern P03 and the pattern P04. Further, similarly, it is preferable not to assign any function to the pattern P01, the pattern P04, the pattern P13 in which the eyelids do not change from the first detection time T1 to the second detection time T2. Furthermore, depending on the interval between the first detection time T1 and the second detection time T2, in order to prevent the execution of the function not intended by the user, it is preferable not to assign any function to some patterns. Note that the functions assigned in response to the patterns are not limited to the functions shown in FIG. 8.

If no function according to the pattern detected by the detection part 185 is assigned (step S520: NO), the control processing of the head mounted display 100 in the second embodiment is ended.

If a function is assigned in response to the pattern detected by the detection part 185 (step S520: YES), the display control part 190 executes the function assigned to the pattern (step S530). For example, if the user opens the right eyelid 72 and closes the left eyelid 74 at the first detection time T1, and then, closes the right eyelid 72 and opens the left eyelid 74 at the second detection time T2, the display control part 190 converts the function assigned to the pattern P10 into a control signal and performs the operation of "Back" of Browser. Note that the control signal in the second embodiment corresponds to input information according to the invention.

As shown in FIG. 8, in addition to the pattern P10, the functions are assigned in response to the respective patterns of the pattern P02, the pattern P03, the pattern P05, the pattern P07, the pattern P12, and the pattern P15. The function assigned to the pattern P12 is the function performed for the program such as a browser like that to the pattern P10. The other functions of the respective patterns are the same functions as the operation modes in the head mounted display 100 of the first embodiment, and executed regardless of the contents of the images being visually recognized by the user (for example, the Internet, moving image contents, etc.) unlike the functions of the pattern P10 and the pattern P12.

As explained above, in the head mounted display 100 in the second embodiment, the detection part 185 detects the states of the eyelids of the user and the display control part 190 executes the functions assigned to the respective detected patterns of the eyelids, and thereby, the user can perform operations without using hands and the convenience may be improved.

Further, in the head mounted display 100 in the second embodiment, the detection control part 183 detects the opened and closed states of the right eyelid 72 and the left eyelid 74 at the first detection time T1 and the second detection time T2, and the detection part 185 detects the pattern of the opened and closed states of the eyelids. The display control part 190 converts the function assigned to the pattern of the eyelids into the control signal and performs an operation. Accordingly, in the head mounted display 100 in the second embodiment, the user can perform operations without using hands and can execute plural functions assigned in response to the patterns of the opened and closed states of the eyelids, and thereby, the convenience may be more improved. Further, in the head mounted display 100 in the second embodiment, the detection part 185 detects only the two kinds of states of the opened state and the closed state of the eyelids, and thereby, operability with high accuracy and less false detection may be realized. Furthermore, the head mounted display 100 in the second embodiment includes the control unit 10 and the image display unit 20, and thereby, an image display with high portability may be realized.

Further, in the head mounted display 100 in the second embodiment, the detection control part 183 determines an eye blink if the time in which the eyelid is closed is shorter than the preset threshold value Tth and interprets it as the opened state of the eyelid, not the closed state, and the detection part 185 detects the opened and closed states of the eyelid. Accordingly, in the head mounted display 100 in the second embodiment, the detection part 185 does not detect the closed state of the eyelid of the eye blink, and thus, false detection of the state of the eyelid may be avoided.

Furthermore, in the head mounted display 100 in the second embodiment, the pattern P16 is the same as the normal state in which the eyelids of the eyes are constantly opened, and thus, no function is assigned to the pattern P16, and no function is assigned to one of the pattern P03 and the pattern P04. In addition, no function is assigned to the pattern P01, the pattern P04, the pattern P13 in which the eyelids do not change from the first detection time T1 to the second detection time T2. Accordingly, in the head mounted display 100 in the second embodiment, since no function is assigned to some patterns of the patterns of the eyelids, when the functions assigned to the respective patterns are executed, execution of the function not intended by the user may be avoided.

C. Modified Examples

Note that the invention is not limited to the above described embodiments, but can be implemented in various forms without departing from the scope of the invention. For example, the following changes can be made.

C1. Modified Example 1

The configurations of the head mounted display 100 in the embodiments are just examples and various changes can be made. In the first embodiment, when the detection part 185 detects the eyelids of the user kept closed in the predetermined time, the part determines the user is asleep. However, the user may just close the eyelids, not sleep or may half close the eyes. Accordingly, the display control part 190 may allow the image display unit 20 to display a message of power-saving transition immediately before the power-saving transition. Further, at the same time, the sound processing part 170 gives a message of power-saving transition in sound. Note that the message of power-saving transition may be given only by display of the display control part 190 or sound of the sound processing part 170. If the detection part 185 detects the eyelids of the user opened after notification of the power-saving transition to performance of the power-saving transition, the display control part 190 does not perform the power-saving transition. Therefore, the head mounted display 100 may not perform power-saving transition only depending on the states of the eyelids of the user detected by the detection part 185, but may perform power-saving transition after confirmation of the will of the user.

C2: Modified Example 2

In the first embodiment, power-saving transition and recovery transition are stepwise transitions in response to the states of the eyelids of the user, however, power-saving transition and recovery transition not in the stepwise manner may be employed. For example, the head mounted display 100 may suddenly turn off the power switch 18, suddenly transit to the standby mode, or suddenly stop the image generation parts 244, 246 in response to the states of the eyelids of the user.

C3: Modified Example 3

In the embodiments, the detection part 185 detects the states of the eyelids of the user using the infrared sensor 50, however, may detect using other detection devices. For example, the detection part 185 may detect the states of the eyelids using an imaging device such as a CCD. Further, the detection part 185 may detect the states of the eyelids by detecting the motion of the muscles at an eye blink using pressure sensors provided in the ear-fit parts 21.

In the embodiments, the detection part 185 realizes detection of the states of the eyelids of the user using the infrared sensor 50, however, the detection can be made by known various methods. For example, the detection may be realized by a detection method using a reflection sensor of placing an infrared light emitting diode and a photodiode in front of the eyes (http://www.ee.toyota-ct.ac.jp/~ozeki/index.html).

C4: Modified Example 4

The predetermined time in which the eyelids of the user are kept closed, which is the criterion for power-saving transition in the first embodiment, is just an example, and may be set to an arbitrary value. Further, when recovery transition is determined, recovery transition may be performed if the eyelids of the user are opened in a predetermined time (for example, three seconds).

C5: Modified Example 5

In the first embodiment, the control unit 10 ends the standby mode if the power switch 18 of the operation part 110 is pressed down, however, the standby mode may be ended by other operation. The control unit 10 may end the standby mode if other button than the power switch 18 of the operation part 110 is pressed down. Further, an acceleration sensor may be provided in the operation part 110, and the control unit 10 may end the standby mode if the operation part 110 detects predetermined acceleration.

C6: Modified Example 6

In the embodiments, the control unit 10 stops the operations of the image processing part 160, the display control part 190, the detection control part 183, and the sound processing part 170 in the standby mode, however, not all of the operations of the functional parts may be stopped. For example, the control unit 10 may reduce the power consumption by stopping only the operation of the image processing part 160.

Further, in the embodiments, the operating system 150, the image processing part 160, the display control part 190, the detection part 185, and the sound processing part 170 are realized by the CPU 140 executing software, however, they may be realized by hardware such as an electronic circuit. For example, when the image processing part 160 and the display control part 190 are realized by an electronic circuit, the control unit 10 may reduce the power consumption by stopping the operations of the image processing part 160 and the display control part 190.

C7: Modified Example 7

In the second embodiment, specific times are exemplified as the times when the detection part 185 detects the states of the eyelids of the user, however, the detection times are not limited to those. The length of the time is not limited, and the detection times may be set by the user of the head mounted display 100. The states of the eyelids detected at the start time T0 are not limited to the states of the embodiment, and the states of the eyelids different from those of the second embodiment may be detected by the detection part 185 for setting of the start time T0. For example, the start time T0 may be set to when the condition that the eyelids are closed in a predetermined period is detected or when a predetermined number of eye blinks are detected in a predetermined period. Further, the start time T0 may be set to the time when the operation part 110 receives the operation, or the start time T0 may be set to the time when an acceleration sensor provided in the head mounted display 100 or the like senses the motion of the head of the user. The states of the eyelids detected by the detection part 185 are not limited to the opened and closed states of the eyelids of the embodiment, however, the states of the eyelids may be detected by opening areas of the eyelids using a CCD or the like. Further, the functions assigned in response to the states of the eyelids are not limited to those of the embodiment, however, for example, functions of stopping and reproducing music contents may be employed.

In addition, the patterns of the opened and closed states of the right eyelid 72 and the left eyelid 74 are not limited to those of the embodiment. FIG. 9 is an explanatory diagram showing examples of functions in response to respective patterns of the eye lids of the user of the head mounted display 100 in a modified example. In the patterns shown in FIG. 9, unlike the patterns shown in FIG. 8 in the second embodiment, the display control part 190 assigns functions in response to the patterns of only the opened and closed states of the right eyelid 72 and the left eyelid 74 at the first detection time T1. Further, in the patterns shown in FIG. 9, the assigned functions are different depending on the contents being viewed by the user even for the same patterns. For example, the function assigned to the pattern P21 performs the operation of "back" when the user views a browser, and performs the operation of "go to the next chapter" when the user reproduces the moving images. Accordingly, in the head mounted display 100 in the modified example, the user can perform operations without using hands and the convenience may be improved. Note that the pattern P24 shown in FIG. 9 is the normal state in which eyelids are opened, and thus, no function is assigned to the pattern P24.

FIGS. 10A and 10B are explanatory diagrams showing examples of input data in response to states of the eye lids of the user of the head mounted display 100 in a modified example. FIG. 10A shows an example of input data in response to the patterns of the eyelids. FIG. 10B shows relations between the opened and closed states of the eyelids and the patterns. In FIGS. 10A and 10B, the display control part 190 converts the patterns of the opened and closed states of the eyelids into input data. As shown in FIG. 10A, the address to be input is designated by the opened or closed state of the right eyelid 72 and the input data to be input is designated by the opened or closed state of the left eyelid 74.

For example, in the head mounted display 100 in the modified example, the detection part 185 detects the opened and closed states of the eyelids of the right eyelid 72 and the left eyelid 74 at intervals of 0.5 seconds from the start time T0 alternately at four times. As shown in FIG. 10B, there are 16 patterns of the respective eyelids in the modified example expressed as binary numbers. As shown in FIG. 10A, the address designated by the combinations of the opened and closed states of the right eyelid 72 is "6" in hex and the input data by the combinations of the opened and closed states of the left eyelid 74 is "F". The display control part 190 inputs the input data corresponding to "F" to the address corresponding to "6". Accordingly, in the head mounted display 100 in the modified example, the user can input the input data without using hands, and the convenience may be improved. Note that the input data and the designated address correspond to the input information according to the invention. Further, instructions in response to the states of the eyelids include designation of the address and input of the input data.

Further, in the second embodiment, the display control part 190 executes the function assigned in response to the detected pattern of the opened and closed states of the eyelids, however, may convert the function into a control signal according to a combination with the operation received by the operation part 110 (the touch pad 14, the cross key 16, the power switch 18, etc.) provided in the control unit 10 in addition to the pattern of the eyelids. For example, if the detection part 185 is set to detect the states of the eyelids only when the cross key 16 of the control unit 10 is pressed down, the user may freely determine the times of the start time T0, the first detection time T1, and the second detection time T2, and thus, false detection of the states of the eyelids may be avoided. Further, in the combinations of the patterns of eyelids and the operations, more functions may be assigned than the functions assigned only by the patterns of eyelids.

Furthermore, the display control part 190 may convert a function into a control signal according to a combination with a motion of the head of the user sensed by an acceleration sensor or the like connected to the control unit 10 and provided in the head mounted display 100 in addition to the pattern of the eyelids. In the head mounted display 100 in the modified example, the user can perform operations without using hands and the user can freely determine the times of detection, and thus, false detection of the states of eyelids may be avoided and more functions may be assigned. Further, the function may be further converted into a control signal by combining it with the operation received by the operation part 110. Note that the control signal of the head mounted display 100 in the modified example corresponds to the input information according to the invention.

In addition, in the second embodiment, the detection part 185 detects the opened and closed states of the respective eyelids at the first detection time T1 and the second detection time T2, however, the detection condition of the eyelids is not limited to that. For example, in the head mounted display 100 of the second embodiment, the detection part 185 may detect the number of opened and closed times of the eyelids in the section from the start time T0 to the second detection time T2 and the display control part 190 may execute the function assigned to the pattern in response to the number. In the head mounted display 100 of the modified example, the display control part 190 executes the function assigned to the pattern according to the number of opened and closed times of the eyelids in a predetermined time detected by the detection part 185, and thereby, the user can perform operations using simple state changes of the eyelids and the convenience may be improved.

Further, in the second embodiment, the display control part 190 executes the function assigned in response to the pattern of the opened and closed states of the right eyelid 72 and the left eyelid 74, however, may execute the function in response to the opened or closed state of only the right eyelid 72 or only the left eyelid 74. Furthermore, in the second embodiment, the timing of detection of the states of the eyelids by the detection part 185 is based on the relation with the time, however, not necessarily. For example, the display control part 190 may inform the user of the times when the detection part 185 detects the states of the eyelids by sound. Further, the display control part 190 may inform the user of the times of detection of the states of the eyelids by displaying an image displayed on the image display unit 20, for example, a count to the detection of the states of the eyelids on the image display unit 20 or otherwise, or allows the image display unit 20 to display the detected pattern at the same time.

C8. Modified Example 8

In the embodiments, the cross key 16 provided in the control unit 10 may be omitted, or another operation interface such as an operation stick may be provided in addition to the cross key 16 and the touch pad 14. Further, the control unit 10 may have a configuration to which input devices such as a keyboard and a mouse can be connected and receive inputs from the keyboard and the mouse. Furthermore, a communication part such as a wireless LAN may be provided in the control unit 10.

Further, in the embodiments, the control unit 10 and the image display unit 20 are wired-connected by the connection part 40, however, the control unit 10 and the image display unit 20 may be connected via a wireless LAN, infrared communication, or a signal transmission path such as Bluetooth.

In the embodiments, the image display unit 20 is the HMD for wearing like eyeglasses, however, the image display unit 20 may be a typical flat display (a liquid crystal display, a plasma display, an organic electro-luminescence (EL) display, or the like). Also, in this case, the connection between the control unit 10 and the image display unit 20 may be connection via a wired signal transmission path or a wireless signal transmission path. According to the configuration, the control unit 10 may be used as a remote of the typical flat display.

Further, as the image display unit, in place of the image display unit 20 worn-like eyeglasses, an image display unit having another shape such as an image display unit worn like a hat, for example, may be employed. Furthermore, the earphones 32, 34 may be omitted.

In addition, in the embodiments, as a configuration of generating image light, the LCD and the light source are used, however, in place of them, another display device such as an organic EL display may be employed.

Further, in the embodiments, the head mounted display 100 is the optically transmissive head mounted display of a binocular type, however, the invention may be applied to other types of head mounted displays such as a video transmissive type, a non-transmissive type, or a monocular type. Furthermore, the invention may be applied not only to the operation of the head mounted display but also to operation of equipment such as a personal computer, a projector or a television.

Further, in the embodiments, the head mounted display 100 has the configuration including the control unit 10 and the image display unit 20, however, not limited to the configuration. Even in other equipment than the head mounted display 100 (for example, a portable terminal, a machine operation unit in a factory or the like, a medical terminal, an instrument such as an oscilloscope, a projection image display, a monitor of a personal computer, a television, or the like), the control unit 10 gives instructions in response to the states of the eyelids detected by the detection part 185, and thereby, the user can perform operations without using hands and the convenience may be improved.

Further, in a detection indicator, a state detection controller, an eyelid sensing controller, or the like, the control unit gives instructions in response to the detected states of the eyelids, and thereby, the user can perform operations without using hands and the convenience may be improved. For example, in a remote of the equipment, locking of operation may be set to perform on/off-control in opening and closing of the eyelids. Further, in a mouse pointer of a computer, double blink of both eyes within a predetermined time may be control of performing the same instruction as the double click of the mouse, or control of the mouse pointer moving to the right at a predetermined speed when only the right eyelid is closed may be set.

Further, in the embodiments, part of the configuration realized by hardware may be replaced by software, or, conversely, part of the configuration realized by software may be replaced by hardware. For example, in the embodiments, the image processing part 160 and the sound processing part 170 are realized by the CPU 140 reading out and executing the computer program, however, these functional parts may be realized by a hardware circuit.

Furthermore, in the case where part or all of the functions of the invention are realized by software, the software (computer programs) may be provided in storage in a computer-readable recording medium. In this invention, "computer-readable recording medium" includes not only a portable recording medium such as a flexible disc or CD-ROM but also an internal memory device within a computer such as various kinds of RAMs and ROMs and an external memory device fixed to the computer such as a hard disc.

C9. Modified Example 9

In the embodiments, the head mounted display 100 may guide image lights representing the same image to the right and left eyes of the user and allow the user to visually recognize a two-dimensional image, or may guide image lights representing different images to the right and left eyes of the user and allow the user to visually recognize a three-dimensional image.

Further, in the embodiments, the contents data is supplied from the external equipment OA, however, contents data may be stored in the storage part 120 of the control unit 10 of the head mounted display 100 and image display may be performed based on the contents data stored in the storage part 120.

Furthermore, of the component elements in the above described embodiments, the elements other than the elements described in independent claims are additional elements, and may appropriately be omitted or combined.

The entire disclosure of Japanese Patent Application Nos. 2011-066383, filed Mar. 24, 2011 and 2011-255791, filed Nov. 24, 2011 are expressly incorporated by reference herein.

What is claimed is:

1. A device comprising:
a detector that detects states of eyelids of a user; and
a controller that (i) gives instructions in response to the states of the eyelids of the user detected by the detector and (ii) converts respective patterns of the states of the eyelids detected by the detector into input information according to a predetermined rule, wherein:
in response to a pattern of the detected states of the eyelids of the user, the instructions given by the controller control an order of image data displayed by an image display, and
the detector interprets as an opened state of the eyelids a case in which the duration for which the eyelids are closed is shorter than a predetermined value.

2. A head mounted display comprising:
the image display, which has an image light generator that generates and outputs image light based on image data and a light guide that guides the image light to eyes of the user and allows the user to visually recognize a virtual image; and
the device according to claim 1, connected to the image display, wherein:
the controller transmits the image data to the image display and controls display by the image display, and
the controller switches the image display among plural operation modes with different power consumption in response to the states of the eyelids of the user detected by the detector.

3. The device according to claim 1, wherein the controller performs a predetermined operation in response to the input information.

4. The device according to claim 1, wherein the detector detects opened and closed states of the eyelids at predetermined times.

5. The device according to claim 4, wherein the respective patterns include patterns defined by combinations of the opened and closed states of the eyelids.

6. The device according to claim 4, wherein:
the detector detects the states of a right eyelid and of a left eyelid of the eyelids of the user, and
the respective patterns include patterns defined by combinations of the states of the right eyelid and the states of the left eyelid.

7. The device according to claim 1, wherein the controller inputs input data in response to the input information.

8. The device according to claim 1, further comprising an input that receives operations of the user,
wherein the controller converts combinations of the respective patterns and the received operations into the input information according to the predetermined rule.

9. The device according to claim 1, further comprising a sensor that senses motions of a head of the user,
wherein the controller converts combinations of the respective patterns and the motions of the head into the input information according to the predetermined rule.

10. A head mounted display comprising:
the image display, which has an image light generator that generates and outputs image light based on image data and a light guide that guides the image light to eyes of the user and allows the user to visually recognize a virtual image; and
the device according to claim 4, connected to the image display, the device transmitting the image data to the image display and controlling display by the image display.

11. A control method of a device, the method comprising:
detecting states of eyelids of a user;
giving instructions in response to the detected states of the eyelids of the user; and
converting respective patterns of the detected states of the eyelids of the user into input information according to a predetermined rule, wherein:
in response to a pattern of the detected states of the eyelids of the user, the given instructions control an order of image data displayed by an image display unit, and
a case in which the duration for which the eyelids are closed is shorter than a predetermined value is interpreted as an opened state of the eyelids.

12. A device comprising:
a detector that detects states of eyelids of a user; and
a controller that gives instructions in response to the states of the eyelids of the user detected by the detector, wherein:
the instructions given by the controller in response to the detected states of the eyelids of the user control operations of an image display, and
depending on a current status of the image display, the operations of the image display controlled by the instructions differ for the same pattern of states of the eyelids detected by the detector.

13. The device according to claim 12, wherein the operations of the image display controlled by the instructions include at least one of (i) transition to or recovery from a standby mode of the image display; (ii) change in luminance of a light source of the image display; (iii) navigation of a browser displayed by the image display; and (iv) powering off of the image display.

14. A device comprising:
a detector that detects states of eyelids of a user; and
a controller that gives instructions in response to the states of the eyelids of the user detected by the detector,
wherein the detector comprises at least one of:
an infrared sensor that includes (i) an infrared light emitter configured to direct infrared light toward eyes of the user and (ii) an infrared light receiver configured to receive the infrared light reflected by the eyes of the user; and
(ii) a pressure sensor configured to detect motion of muscles of the user corresponding to blinking of at least one of the eyelids.

15. The device according to claim 14, wherein:
the detector comprises the infrared sensor;
the infrared light emitter includes (i) a right infrared light emitter provided on a right display driver of an image display configured to generate and output image light, and (ii) a left infrared light emitter provided on a left display driver of the image display; and
the infrared light receiver is located on a boundary between the right and left display drivers.

16. The device according to claim 14, wherein:
the detector comprises the pressure sensor; and
the pressure sensor is located on an ear-fit part of an image display configured to generate and output image light.

17. The device according to claim 14, wherein the detector comprises either the infrared sensor or the pressure sensor.

18. A head mounted display comprising:
an image display, which has an image light generator that generates and outputs image light based on image data and a light guide that guides the image light to eyes of a user and allows the user to visually recognize a virtual image; and
a device that is connected to the image display and that comprises:
a detector that detects states of eyelids of the user; and
a controller that gives instructions in response to the states of the eyelids of the user detected by the detector, wherein:
in response to a pattern of the detected states of the eyelids of the user, the instructions given by the controller control an order of image data displayed by the image display,
the controller transmits the image data to the image display and controls display by the image display,
the controller switches the image display among plural operation modes with different power consumption in response to the states of the eyelids of the user detected by the detector, and
the controller performs power-saving transition to transition to a said operation mode with lower power consumption when the detector detects that the eyelids of the user are kept closed for a predetermined time.

19. The head mounted display according to claim 18, wherein the controller performs recovery transition to transition to a said operation mode with higher power consumption when the detector detects that the eyelids of the user are opened for a predetermined time after the power-saving transition.

20. The head mounted display according to claim 18, wherein:
the image light generator includes a light source that outputs light and an image generator that converts the light output from the light source into image light representing an image based on the image data, and
the controller reduces the light output from the light source at the power-saving transition.

21. The head mounted display according to claim 19, wherein the controller (i) includes a structure that realizes plural functions and (ii) stops a partial operation of the structure at the power-saving transition.

22. The device according to claim 1, wherein:
the detector detects opened and closed states of the eyelids of the user (i) at a first detection time after a start time and (ii) at a second detection time, and
the controller converts the pattern of the states of the eyelids of the user detected by the detector at the first detection time and the second detection time.

23. The device according to claim 22, wherein the controller performs no function when the states of the eyelids at the first detection time are the same as the states of the eyelids at the second detection time.

24. The device according to claim 1, wherein no function is assigned to another pattern of the detected states of the eyelids of the user.

* * * * *